Patented Apr. 8, 1952

2,592,466

UNITED STATES PATENT OFFICE 2,592,466

PROCESS FOR THE PREPARATION OF PASTE WAX

Robert W. Pressing, Grant P. Lawless, and Bradley J. Pettibone, Racine, Wis., assignors to S. C. Johnson & Son, Inc., Racine, Wis.

No Drawing. Application September 23, 1948, Serial No. 50,872

12 Claims. (Cl. 106—271)

This invention relates to an improved method for the manufacture of wax. More particularly, it relates to an improved method of producing paste wax compositions which are used as polishes.

Paste wax compositions are composed essentially of various waxes dissolved in suitable solvents and are usually prepared by heating the waxes and solvents together or dissolving the waxes in the hot solvents or melting the waxes and admixing the solvents with the melted wax.

In the manufacture of paste wax, it is commercially appreciated that the wax-solvent mixture be poured into containers while such mixture is at a temperature slightly above the solidification point of the mixture. This is necessary if the resulting paste wax is to possess the firmness or hardness desired. Since the wax obviously must be melted at a temperature considerably higher than the solidification point of the wax-solvent mixture, a method of cooling the composition is necessary.

Regardless of the manner in which the wax and solvent are admixed, it has been necessary to pour the solution into containers immediately upon mixing or at least within such a short time period after mixing as not to allow the mixture to begin to solidify. Therefore, in the manufacture of paste wax, should a work stoppage occur in the filling process by reason of a breakdown in apparatus or other cause, the manufacturing process is also stalled. Likewise, when a halt occurs in the mixing or manufacturing process, the filling operation is bottlenecked. Elimination of this continual hazard of double work stoppage is greatly desired, but a method by which the manufacturing and filling operation may be separated, and made independent of each other has been heretofore unattained.

Now, in accordance with our invention, we have developed the process of manufacturing a paste wax composition comprising placing wax and solvent in solution at a temperature of at least 145° F., cooling said solution while in a condition of streamline flow to a temperature slightly above the solidification point of said solution before introducing said solution into containers.

Now, having indicated in a general way, the nature and purpose of this invention, the following examples will illustrate this invention. It is to be understood, however, that such examples are presented merely as illustrations of the invention, and are not to be construed as limiting the same. In the examples, the ingredients are given in parts by weight, unless otherwise indicated.

Example 1

One hundred five parts of wax base containing 70 parts of hard paraffin wax and 35 parts of carnauba wax was melted and put into solution with 395 parts of naphtha. After thorough agitation, the mixture, having a temperature of approximately 150° F. was retained into a suitable storage vessel where it was maintained at a temperature of about 150° F. for a period of two weeks. Thereupon, in order to cool the solution to a temperature slightly above its solidification point before pouring it into containers, the solution was passed through a scraper cooler which consisted of a water-jacketed six inch brass pipe, four feet long, equipped with a central shaft five inches in diameter, holding two sets of laminated rotatable scraper blades diametrically opposite each other. These scrapers were so incorporated for the purpose of scraping the inner periphery of the pipe, freeing the wax which had thrown out of solution and had built up a film on the inner wall. Water was continually introduced into the jacket about the pipe at a temperature of about 70° F. The wax solution was cooled to a temperature slightly above the point at which it commences solidification, poured into cans and allowed a quiescent or hardening period of 3 hours.

The results rendered the paste wax by this type of cooler or heat transfer may be seen in the following table:

| Scraper R. P. M. | Solution Flow Rate Gals. per Min. | Cone Penetration (.1 mil.) |
| --- | --- | --- |
| 6.0 | 1.0 | 150 |
| 44.0 | .4 | 147 |
| 10.75 | .8 | 143 |
| 44.0 | .8 | 160 |

All of the paste wax formed, after being cooled by this method, was unsatisfactory in that the paste had a cone penetration point above 130 (the maximum acceptable). This penetration number was evaluated by means of a cone penetrometer which records the hardness or firmness of the paste in tenths of millimeters.

The solution in the above example was in a condition of turbulent flow during cooling.

Example 2

A wax-solvent solution was prepared and stored for two weeks as in Example 1. Since the solution was maintained at a temperature of approximately 150° F., cooling was necessary in order to reduce the temperature of the solution to 110° F.–120° F., or slightly above the solidification point of the mixture. Therefore, the solution, at two rates of flow, was passed through a cooler consisting of a bank of water-jacketed, one inch pipes, seven feet long. After this cooling, the wax-solvent mixture was poured into containers and allowed a quiescent period of approximately three hours. The resulting firmness rendered the wax paste by this type of heat exchanger employing no agitating or scraping means was found to be:

| Solution Flow Rate (Gals. per min.) | Reynold's No. | Cone Penetration |
|---|---|---|
| 0.7 | 975 | 90–100 |
| 1.1 | 1,500 | 100–110 |

These paste wax specimens were found to be satisfactory in that each possessed a penetration point of 130 or less. The solution in the above example was in a condition of streamline flow during cooling.

*Example 3*

A wax-solvent solution was prepared as in Example 1. No storage period was allowed, but the solution was cooled immediately in the manner illustrated in Example 2. A portion of the solution charge was cooled at a flow rate of .7 gallons per minute, another portion at 1.1 gallons per minute. The wax-solvent mixture was poured into containers and after a three-hour quiescent period formed a firm, hard paste wax which was tested with a cone penetrometer and found to have substantially the same penetration ratings as the wax paste of Example 2.

The solution in the above examples was in a condition of streamline flow during cooling.

The word "streamline" as pertains to the type of flow employed, is employed as being synonymous with flows sometimes referred to as "laminar" or "biscous."

The Reynold's number, referred to in the table of Example 2, is a dimensionless figure used as a means of determining fluid-flow characteristics. This number is calculated by multiplying the diameter of the pipe in feet by the velocity of the fluid in feet per hour. The product of the diameter and velocity is then multiplied by the density of the fluid at average temperature during cooling in pounds per cubic foot. This product is then divided by the viscosity of the fluid at average temperature during cooling in pounds per foot hour.

It is well known, as indicated in Example 2, that as the Reynold's number, commonly abbreviated as Re., is increased from 0 to 2100, the fluid will assume laminar or streamline flow while a Re. above 4000 will be turbulent in flow. Between 2100 and 4000 the flow may be laminar or turbulent, depending upon the surface conditions of the fluid carrier and the fluid characteristics.

Where the solution was caused to be agitated in Example 1 by virtue of the scrapers, or where the flow is turbulent rather than streamline, poor pastes result, i. e., those which do not satisfy the cone penetrometer test. The stored wax-solvent mixture may be agitated or brought to turbulent flow when the temperature of such mixture is above 145° F. However, any such agitation or turbulent flow of the solution during the cooling operation, when the solution is at a temperature within a range of approximately 120° F. to about 140° F. will result in a poor, unsatisfactory paste. These effects, though evident, are unexplained, but the cause of the phenomenon is probably involved in the physics of gelation of paste wax.

As seen by Examples 2 and 3, a satisfactory paste may be obtained when the solution is cooled while in a condition of streamline flow, regardless of whether or not the composition has undergone a storage period or used immediately after formation.

It should be realized that the Reynold's numbers, as hereinbefore calculated, do not take into consideration the effect of the rough return bends joining the pipes used in Example 2.

In the examples, the temperature at which the solution was stored has been shown as 150° F. However, it should be appreciated that storage may be conducted at a minimum of approximately 145° F. We have found that where wax-solvent mixtures are stored at temperatures less than approximately 145° F., the minute wax particles commence to "throw themselves out" of solution. This minimum storage temperature is that which is needed to keep the mixture in a "true" solution and may vary according to the type of wax base employed.

Two weeks has been given in the example as the storage period. This is, however, only by way of illustration, since the solution may be stored indefinitely so as long as the teachings of the invention are adhered to.

In the examples, certain waxes have been set forth as constituting the wax base. It should be understood, however, that a variety of waxes may be successfully used. For example, hard vegetable waxes such as carnauba, candelila and ouricury may be employed, but it is suggested that in order to obtain the optimum satisfaction in the resulting film, the hard wax be blended with a soft plasticizer such as paraffin, beeswax or synthetic wax. Paraffin wax shall include crystalline and microcrystalline paraffins which are mixtures of hydrocarbons derived from petroleum and mineral wax or native paraffin known as ozokerite. If desired, the paraffin wax may be oxidized prior to use.

While in the examples, naphtha has been used as the wax solvent, it should be understood that the invention is not so limited. Other volatile solvents such as turpentine, stoddard solvent, benzene, gasoline, and other organic solvents may be used. Chlorinated organic solvents such as tetrachloroethylene, trichloroethylene, and carbon tetrachloride are also operable.

Thus, in accordance with our invention a process has been set forth whereby a wax-solvent may be cooled to the desired pouring temperatures and a composition rendered which possesses the desired firmness. Moreover, the process now allows the manufacturing and filling operations in the production of paste wax to be independent of each other.

Other modes of applying the principle of the invention may be employed instead of those explained, change being made as the process herein disclosed, provided the step or steps stated in any of the following claims or the equivalent of such stated step or steps be employed.

We claim:

1. The process of making a paste wax composition comprising placing wax and solvent in solution at a temperature of at least 145° F., cooling said solution while in a condition of streamline flow to a temperature slightly above the solidification point of said solution before introducing said solution into containers.

2. The process of making a paste wax composition comprising placing carnauba wax and naphtha in solution at a temperature of at least 145° F., cooling said solution while in a condition of streamline flow to a temperature slightly above the solidification point of said solution before introducing said solution into containers.

3. The process of making a paste wax composition comprising placing carnauba wax, paraffin wax and naphtha in solution at a temperature of at least 145° F., cooling said solution while in a condition of streamline flow to a temperature slightly above the solidification point of said solution before introducing said solution into containers.

4. The process of manufacturing a paste wax composition comprising placing wax and solvent in solution at a temperature of at least 145° F., retaining said solution at a temperature of at least 145° F., cooling said mixture while in a condition of streamline flow to a temperature slightly above the solidification point of said solution before introducing said solution into containers.

5. The process of manufacturing a paste wax composition comprising placing carnauba wax and naphtha in solution at a temperature of at least 145° F., retaining said solution at a temperature of at least 145° F., cooling said mixture while in a condition of streamline flow to a temperature slightly above the solidification point of said solution before introducing said solution into containers.

6. The process of manufacturing a paste wax composition comprising placing carnauba wax, paraffin wax and naphtha in solution at a temperature of at least 145° F., retaining said solution at a temperature of at least 145° F., cooling said mixture while in a condition of streamline flow to a temperature slightly above the solidification point of said solution before introducing said solution into containers.

7. The process described in claim 1 in which the solution is cooled from a temperature of not less than 145° F. to a temperature of not more than 120° F.

8. The process described in claim 2 in which the solution is cooled from a temperature of not less than 145° F. to a temperature of not more than 120° F.

9. The process described in claim 3 in which the solution is cooled from a temperature of not less than 145° F. to a temperature of not more than 120° F.

10. The process described in claim 4 in which the solution is cooled from a temperature of not less than 145° F. to a temperature of not more than 120° F.

11. The process described in claim 5 in which the solution is cooled from a temperature of not less than 145° F. to a temperature of not more than 120° F.

12. The process described in claim 6 in which the solution is cooled from a temperature of not less than 145° F. to a temperature of not more than 120° F.

ROBERT W. PRESSING.
GRANT P. LAWLESS.
BRADLEY J. PETTIBONE.

REFERENCES CITED

The following references are of record in the file of this patent:

UNITED STATES PATENTS

| Number | Name | Date |
|---|---|---|
| 1,986,936 | Lewers | Jan. 8, 1935 |
| 2,404,896 | Aelony | July 30, 1946 |